United States Patent
Kishi et al.

(10) Patent No.: US 10,629,036 B2
(45) Date of Patent: Apr. 21, 2020

(54) SURVEILLANCE DEVICE

(71) Applicant: Oki Electric Industry Co., Ltd., Tokyo (JP)

(72) Inventors: Reiko Kishi, Tokyo (JP); Makoto Masuda, Tokyo (JP); Hideto Koike, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 16/302,434

(22) PCT Filed: Jun. 6, 2017

(86) PCT No.: PCT/JP2017/021031
§ 371 (c)(1),
(2) Date: Nov. 16, 2018

(87) PCT Pub. No.: WO2018/012148
PCT Pub. Date: Jan. 18, 2018

(65) Prior Publication Data
US 2019/0279468 A1    Sep. 12, 2019

(30) Foreign Application Priority Data
Jul. 11, 2016  (JP) .................................. 2016-136498

(51) Int. Cl.
*G06Q 40/00*    (2012.01)
*G07F 19/00*    (2006.01)
(Continued)

(52) U.S. Cl.
CPC ....... *G07F 19/207* (2013.01); *G06K 9/00288* (2013.01); *G06K 9/00718* (2013.01);
(Continued)

(58) Field of Classification Search
CPC .... G07F 19/20; G07F 19/201; G06Q 20/1085
(Continued)

(56) References Cited

U.S. PATENT DOCUMENTS 5,850,470 A  *  12/1998  Kung ................. G06K 9/00241
                                                             382/157
2010/0026808 A1*  2/2010  Kagehiro ............... G07F 19/20
                                                             348/152
(Continued)

FOREIGN PATENT DOCUMENTS

JP    2001-312469 A    11/2001
JP    2003-044127 A    2/2003
(Continued)

OTHER PUBLICATIONS

Nobuyuki Otsu, "ARGUS: Adaptive Recognition for General Use System", Synthesiology, vol. 4 No. 2, pp. 70-79, May 2011; English abstract.

*Primary Examiner* — Ahshik Kim
(74) *Attorney, Agent, or Firm* — Rabin & Berdo, P.C.

(57) ABSTRACT

The present disclosure provides a surveillance device that monitors an operation section of an automated transaction device, the surveillance device including: a learning holding section that learns and holds a reference scene data set in which a reference operation is divided into a sequence of action items; a feature extraction section that extracts actual target action data from actual scene data of the sequence of action items in an operation of a user, the actual scene data obtained from an imaging section that faces and images the operation section; and a detection section that associates actual target action data with a reference scene data set along the sequence of action items, compares for each of the action items, determines an anomaly level of the operation of the user, and outputs an anomalous occurrence signal according to the anomaly level.

20 Claims, 20 Drawing Sheets

(51) Int. Cl.
  *G06K 9/00* (2006.01)
  *G08B 13/196* (2006.01)
  *G07D 9/00* (2006.01)
(52) U.S. Cl.
  CPC ........... *G06K 9/00744* (2013.01); *G07D 9/00* (2013.01); *G07F 19/2055* (2013.01); *G08B 13/196* (2013.01); *G06K 2009/00738* (2013.01)
(58) Field of Classification Search
  USPC ........................................................ 235/379
  See application file for complete search history.

(56) References Cited

U.S. PATENT DOCUMENTS

| | | | | |
|---|---|---|---|---|
| 2011/0102590 A1* | 5/2011 | Holland-Letz | ......... | G07F 19/20 348/143 |
| 2015/0288934 A1* | 10/2015 | Wang | .................... | H04N 7/188 348/143 |
| 2017/0372144 A1* | 12/2017 | Kurita | .................. | G08B 13/196 |

FOREIGN PATENT DOCUMENTS

| | | | |
|---|---|---|---|
| JP | 2010-079740 A | 4/2010 |
| JP | 2010-079749 A | 4/2010 |
| JP | 2011-154519 A | 8/2011 |
| JP | 2012-141989 A | 7/2012 |

* cited by examiner

FIG.7

| ACTION ITEM | ACTION | ANALYSIS REGION | IMPORTANCE LEVEL |
|---|---|---|---|
| 1 | CARD INSERTION | CARD PORT | 5 |
| 2 | PIN INPUT | NUMBER KEYS | 4 |
| 3 | SHUTTER OPENING | SHUTTER | 0 |
| 4 | BANKNOTE INSERTION | SHUTTER | 3 |
| 5 | SHUTTER CLOSING | SHUTTER | 0 |
| 6 | RECEIPT COLLECTION | RECEIPT PORT | 1 |
| 7 | CARD DISPENSING | CARD PORT | 0 |
| 8 | CARD RETRIEVAL | CARD PORT | 2 |
| 9 | NO ACTION | ALL REGIONS | 2 |

FIG.10

| REGION | LEARNING ACTION | | | |
|---|---|---|---|---|
| CARD PORT | CARD INSERTION | CARD RETRIEVAL | NO ACTION | OTHER NORMAL BEHAVIOR |
| NUMBER KEYS | PIN INPUT | NO ACTION | OTHER NORMAL BEHAVIOR | |
| SHUTTER | BANKNOTE INSERTION | NO ACTION | OTHER NORMAL BEHAVIOR | |
| RECEIPT PORT | RECEIPT COLLECTION | NO ACTION | OTHER NORMAL BEHAVIOR | |

FIG.14

| ANOMALY LEVEL | ANOMALY RESPONSE |
|---|---|
| A | CALL SECURITY AGENT |
| B | TRIGGER ALARM |
| C | RESTART OPERATION |
| D | RETAIN VIDEO IMAGE LOG |
| E | |

1

SURVEILLANCE DEVICE

TECHNICAL FIELD

The present disclosure relates to a surveillance device that monitors an operation section of an automated transaction device.

BACKGROUND ART

Known automated transaction devices include Automated Teller Machines (ATMs) and Cash Dispensers (CDs), employed in financial institutions. Automated transaction devices are installed in branches of financial institutions such as banks, shops, stores such as convenience stores, and so on. Users perform various operations using input keys and touch panels in response to display screens on an operation section of the automated transaction device. This enables transactions including deposits, withdrawals, and balance enquiries to be performed.

Anomalous behavior detection devices are known that obtain outputs of information relating to anomalous behavior or anomalous positions that are linked to illicit behavior by a human agent. This enables an appropriate response to be taken in order to prevent illicit behavior by a person who is being detected (Japanese Patent Application Laid-Open (JP-A) No. 2012-141989).

Surveillance control systems are known that make it easier to ascertain situations to control the targets to be controlled, even when there are a large number of people and events to be controlled and a large volume of information to be monitored (JP-A No. 2003-044127).

SUMMARY OF INVENTION

Technical Problem

There are surveillance devices that images a user operating an automated transaction device with a surveillance camera, and analyzes the video images to detect mischievous behavior including criminal behavior, such as card skimming, behavior in which the users appears confused, has forgotten a card, or the like.

However, when employing a method such as that of the anomalous behavior detection device of JP-A No. 2012-141989, to detect anomalies in video images subject to detection, the spotting of anomalous actions is difficult in situations, such as an automated transaction device in which various human actions are performed on a single operation section.

In a method to monitor actions such as the surveillance control system of JP-A No. 2003-044127, false reporting of anomalous action detections is liable to arise in situations where human behavior varies from person to person, resulting in inconsistent and differing actions.

The present disclosure provides a surveillance device that may improving the precision of anomalous action detection for various actions of a user at an operation section of an automated transaction device, and may enable various anomaly responses to be performed.

Solution to Problem

A first aspect of the present disclosure is a surveillance device that monitors an operation section of an automated transaction device, the surveillance device including: a learning holding section that learns and holds a reference scene data set in which a reference operation is divided into a sequence of action items; a feature extraction section that extracts actual target action data from actual scene data of the sequence of action items in an operation of a user, the actual scene data obtained from an imaging section that faces and images the operation section; and a detection section that associates actual target action data with a reference scene data set along the sequence of action items, compares for each of the action items, determines an anomaly level of the operation of the user, and outputs an anomalous occurrence signal according to the anomaly level.

Advantageous Effects

According to the surveillance device of the first aspect of the present disclosure, a reference operation (normal action model) on the automated transaction device is learnt in advance as reference scene data, by being learnt individually for each action item and for each analysis region. Actual target action data is extracted in real time from video images (actual scene data) being imaged of an anomalous action of a user, such as criminal behavior, mischief, or the like in an actual operation. Any anomalies are then detected by comparing the extracted actual target action data with the reference scene data for each of the action items. Then, when an anomaly has been detected, an anomaly level is identified according to an anomalous value and an importance (weighting) of the action item in which the anomaly occurred, and an anomaly response is performed according to the anomaly level. Thereby, the first aspect of the present disclosure may improve the precision of anomalous action detection for various actions of users at the operation section of the automated transaction device. The surveillance device of the present disclosure may also include various anomaly response sections configured to trigger alarms, call surveillance agents, and the like.

BRIEF DESCRIPTION OF DRAWINGS

FIG. 7 is a table illustrating a flow of normal actions that are performed by a surveillance device of the first exemplary embodiment.

FIG. 10 is a table illustrating actions learnt by a surveillance device of the first exemplary embodiment.

FIG. 14 is a table illustrating an example of anomaly levels and anomaly responses as performed by a surveillance device of the first exemplary embodiment.

DESCRIPTION OF EMBODIMENTS

Figure 1:
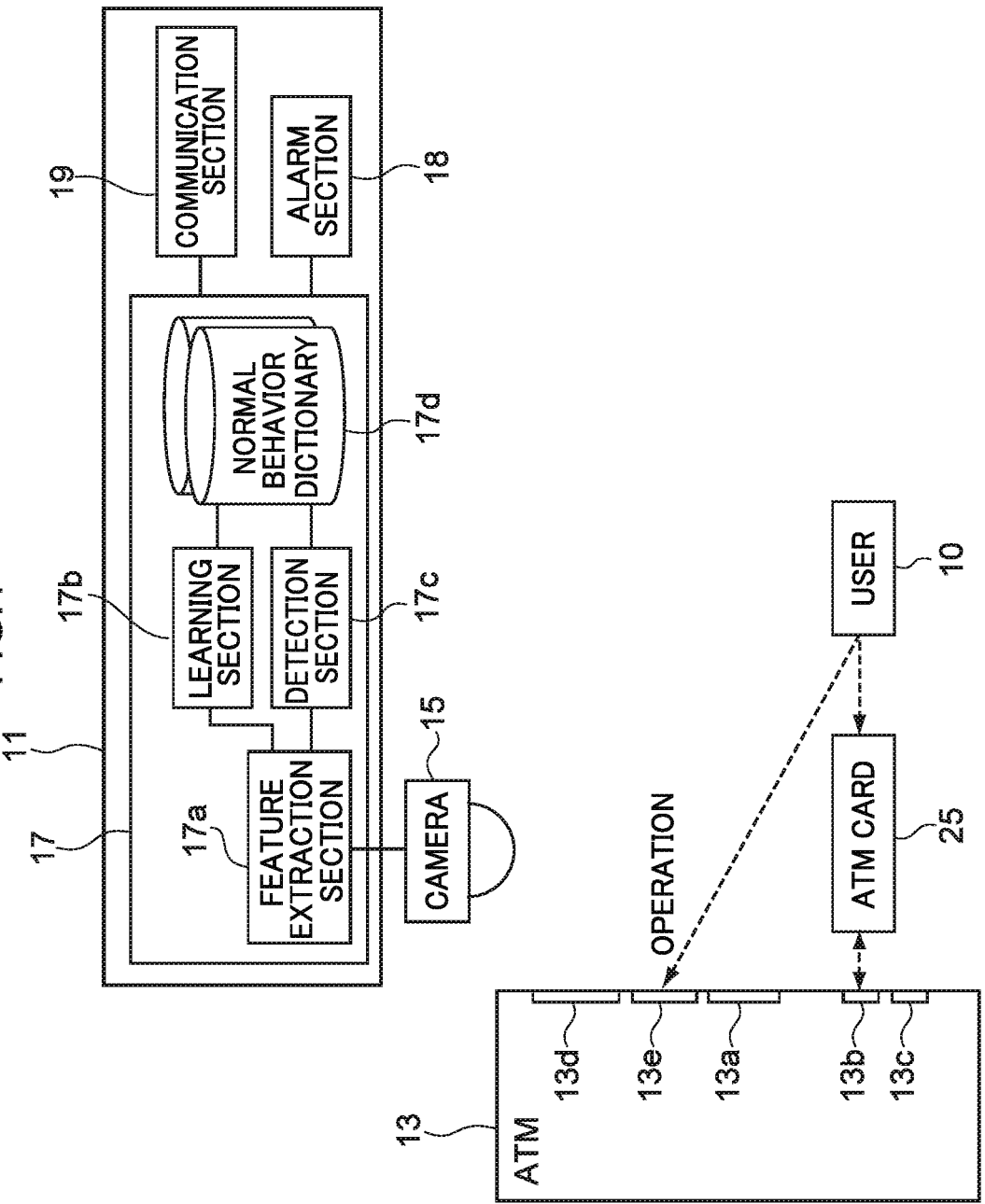
FIG. 1 is a block diagram illustrating configuration of a surveillance device employed in an automated transaction device of a first exemplary embodiment.

Explanation follows regarding an example of a surveillance device for a cash-handling automated transaction device (referred to hereafter as an ATM) according to exemplary embodiments of the present disclosure, with reference to the drawings. Note that the present disclosure is not limited to the exemplary embodiments described below. Note that elements having substantially the same functions and configurations as each other in the exemplary embodiments are denoted the same reference numerals, and duplicate explanation thereof is omitted.

Since the action flow by a user operating the ATM is often to some extent pre-ordained, the surveillance device of the present exemplary embodiment employs a method to check whether there is anything anomalous in the action flow of an operation by the user. However, although patterns of a flow of user actions when operating the ATM may be said to be pre-ordained, various actions occur in a single action flow, such as inserting a card, touching a screen, and inserting banknotes. Moreover, various movements, such as placing hands on the device, or being confused by operation, that may occur depend on the user. Accordingly, in cases in which all such actions are learnt as normal actions, anomalous behavior may be overlooked, or the surveillance device may make false detections even when it is actually normal behavior that is being performed. If all actions that might take place at an ATM are learnt mechanically as a single normal behavior, due to the movement and position varying according to the action, anomalous actions that are only subtly different becomes difficult to detect.

In order to eliminate false detection, the surveillance device of a first exemplary embodiment utilizes the fact that an action flow when using the ATM is to some extent pre-ordained, divides a normal action flow into plural action items, and constructs a normal action model (reference scene data set) by learning each of the action items individually. The surveillance device then compares each action item in the operation by the user against the normal action model to determine whether or not anything is anomalous. In the surveillance device of the first exemplary embodiment, the action items are arranged in an operation sequence, and plural analysis regions are determined in advance within a video image in which the respective action items occur. Learning is then performed for each action item in each analysis region, so as to prepare a normal action model for normal actions.

However, when an action flow that to some extent follows a pre-ordained pattern is employed, it is sometimes difficult to determine when each of the action items has ended.

Accordingly, a surveillance device of a second exemplary embodiment combines ATM status information in order to recognize times of transition (a start and an end) for each of the respective action items. For example, at a timing when a user has performed an action of "card insertion", the action of the "card insertion" may be determined to have ended when the card has been read in the ATM status information.

Moreover, a surveillance device of a third exemplary embodiment incorporates a method for detecting anomalous actions in combination with detection of user traits, in order to catch repeat ATM card skimming offenders, to warn suspicious people wearing masks or sunglasses, to detect confused operation by elderly people, and to detect bank transfer fraud targeting elderly people. This is achieved by combining detected matching information of a user's face from another face-detection camera with the first or second exemplary embodiment so as to detect consistent anomalous actions.

First Exemplary Embodiment

Figure 2:
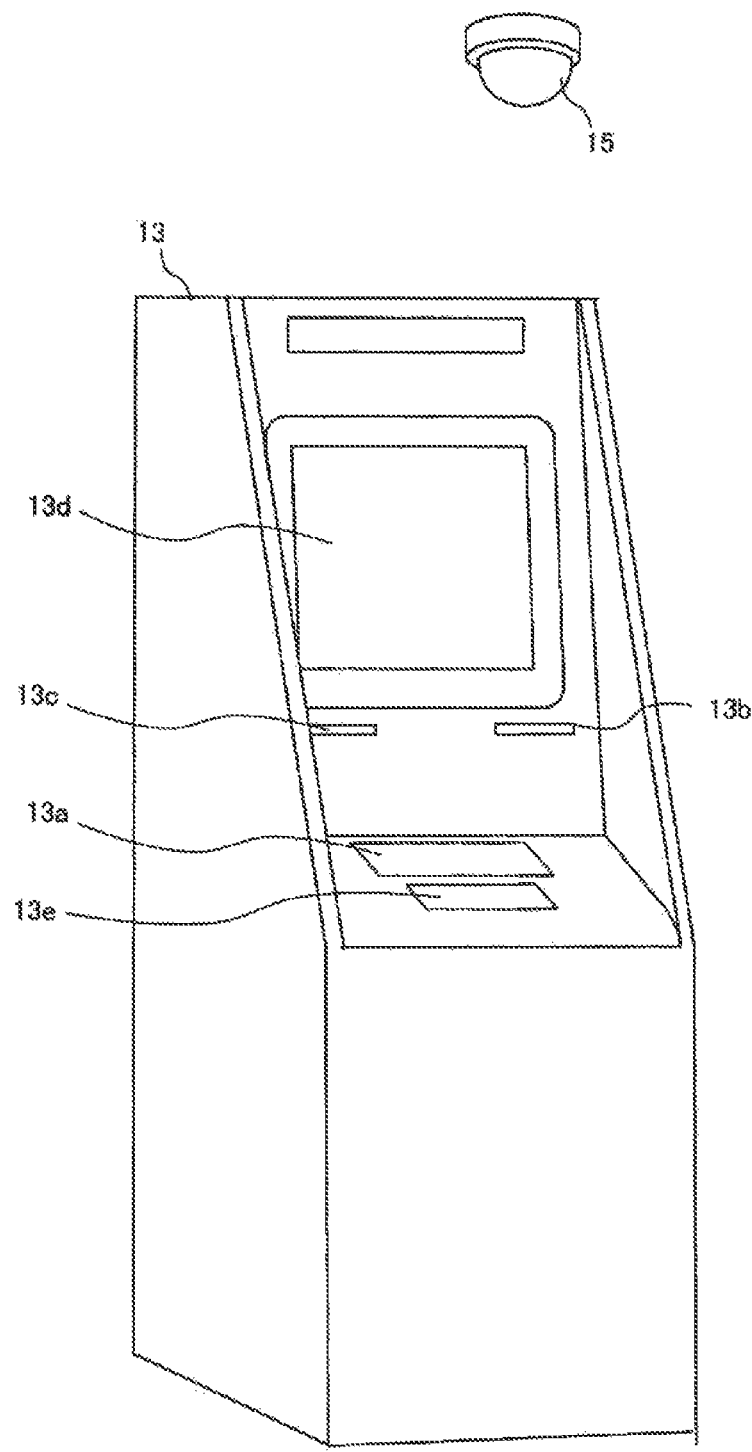
FIG. 2 is a schematic perspective view illustrating an automated transaction device according to the first exemplary embodiment.
Figure 3:
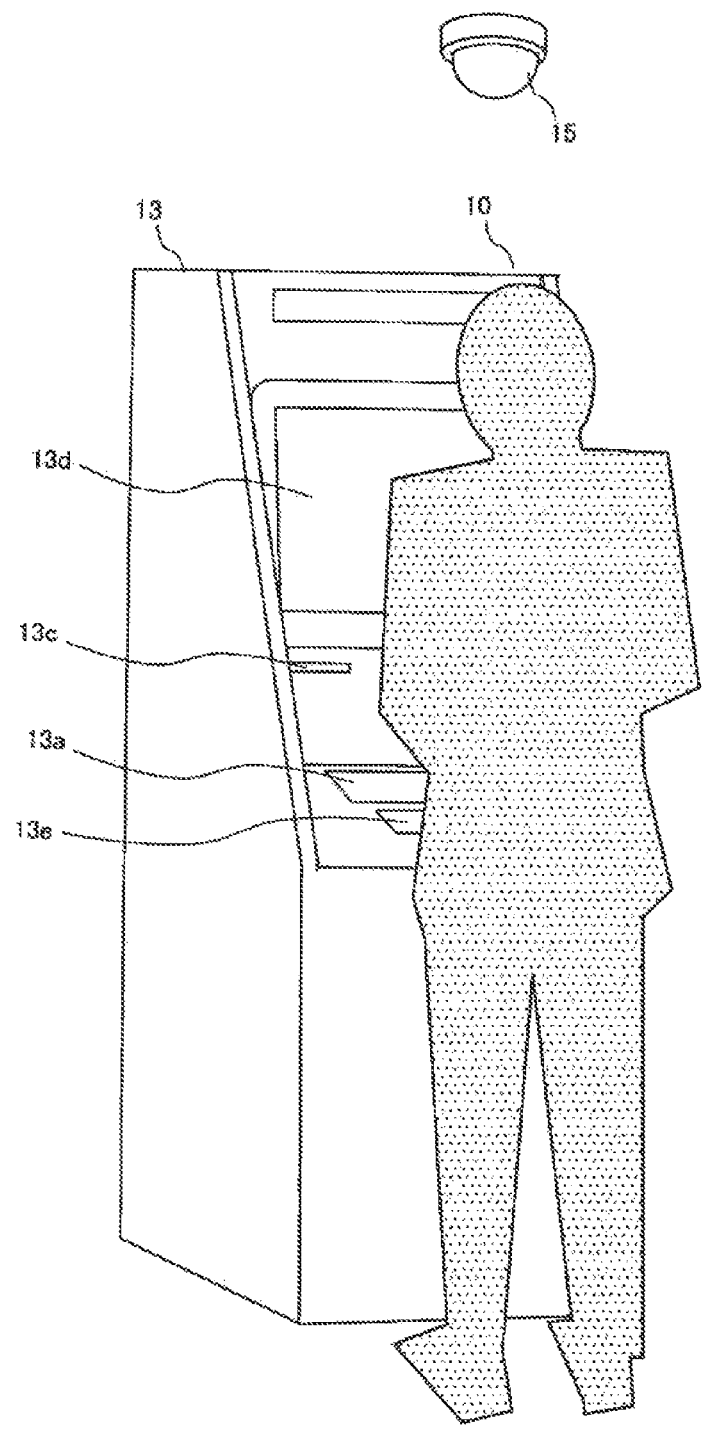
FIG. 3 is a line drawing illustrating an automated transaction device according to the first exemplary embodiment and a user operating the automated transaction device.

FIG. 1 is a block diagram illustrating configuration of a surveillance device 11 of the first exemplary embodiment and an ATM 13 used by a user 10 who is being monitored. FIG. 2 is a schematic perspective view illustrating the ATM 13 of the first exemplary embodiment and a surveillance camera 15 of the surveillance device of the ATM 13. FIG. 3 is a schematic diagram illustrating the ATM 13 of the first exemplary embodiment and the user 10 operating the ATM 13.

As illustrated in FIG. 3, the surveillance camera 15 of the surveillance device 11 is attached to a ceiling or the like, above an operation section of the ATM 13. A card 25, this being a general ATM-only card, can be inserted into the ATM 13 for use in a financial transaction with a financial institution, and is returned to the user 10 after use.

The operation section on a casing exterior of the ATM 13 includes a shutter 13*a* for a banknote pay-in/pay-out port, a card port 13*b*, a receipt port 13*c*, a screen 13*d* configured by a liquid crystal display or the like, and number keys 13e configuring an input section. The user 10 directly operates these elements to perform a transaction with the ATM 13. The ATM 13 executes financial transactions with the financial institution via a communication line through the user 10 operating the operation section.

The surveillance camera 15 images the operation section of the ATM 13 and principally acquires video images of around the hands of the user 10. In the present exemplary embodiment, the surveillance device 11 detects anomalous actions of the user 10 in the video images from the camera 15. The first exemplary embodiment is configured with the ATM 13 and an anomalous action detection section 17, with these not being directly connected to each other.

Figure 4:
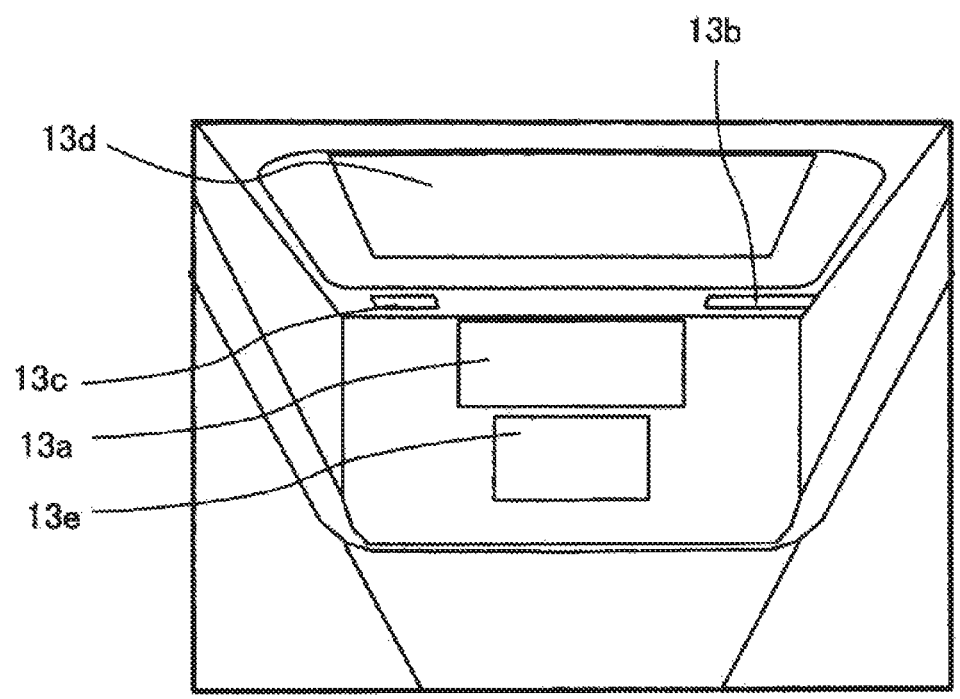
FIG. 4 is an overhead view principally looking downward from overhead, face-on to external configuration of the operation section of an automated transaction device according to the first exemplary embodiment.

FIG. 4 is a single video image (overhead view) of video images captured by the camera 15 and principally looks downward from overhead, face-on to the external configuration of the operation section of the ATM 13. The camera 15 is installed at a location enabling imaging of an operation sequence of the user 10 so as to enable video images of the operation section of the ATM 13 to be acquired from the camera 15. The camera 15 is connected to the surveillance device 11 through at least one out of a wired connection or a wireless connection.

Figure 5A:
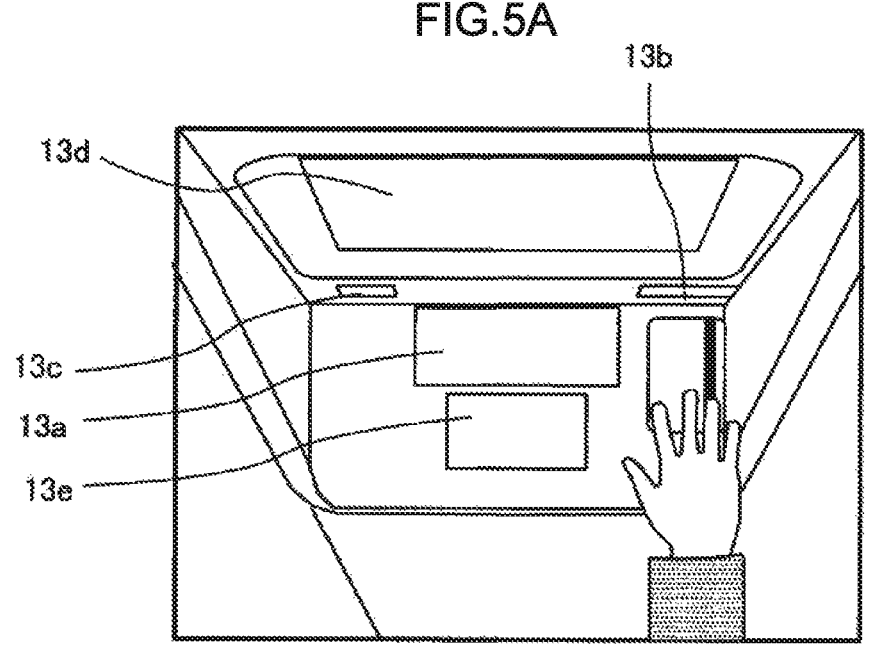
FIG. 5A is an overhead view principally illustrating an example of a normal action A with respect to the external configuration of an operation section of an automated transaction device according to the first exemplary embodiment.
Figure 5B:
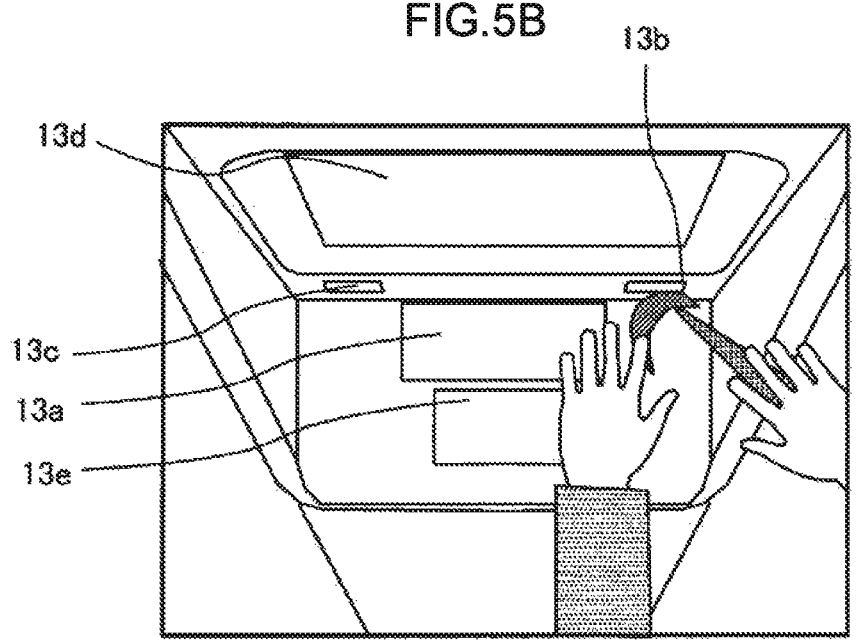
FIG. 5B is an overhead view principally illustrating an example of an anomalous action B with respect to the external configuration of an operation section of an automated transaction device according to the first exemplary embodiment.

FIG. 5A and FIG. 5B are each overhead views illustrating a single video image of video images captured by the camera 15. These video images are subjected to monitoring by the surveillance device 11, and respectively illustrate a normal action (FIG. 5A) and an anomalous action (FIG. 5B) performed principally at the operation section of the ATM 13.

Normal actions when the ATM 13 is being used normally might include card insertion and removal, as illustrated in FIG. 5A, PIN input, screen operation, banknote insertion, receipt collection, and the like. States in which action is being performed, such as a state in which nobody is present at the ATM 13, illustrated in FIG. 4, or a standby state of the ATM 13, are also treated as normal actions.

Actions treated as anomalous actions include criminal behavior such as card skimming, the forgetting of cards and receipts etc., and mischievous behavior. Namely, anomalous actions refer to movements in behavior that does not occur in the operation sequence of a normal action. For example, FIG. 5B illustrates a situation in an anomalous action, in which a tool is being used in a right hand to attach a skimming device to a card insertion port with the right hand. Note that the first exemplary embodiment focuses on the detection of criminal behavior from out of the various anomalous actions.

The surveillance device 11 illustrated in FIG. 1 includes the camera 15 that images the operation sequence of the ATM 13, the anomaly detection section 17 that executes anomaly detection based on video images captured of an operation section space, and outputs an anomalous occurrence signal. The camera 15 is one mode of a video image input section that acquires such video data, and is a digital video camera or the like. The camera 15 outputs data relating to the acquired video.

The anomaly detection section 17 includes a video image input section (not illustrated in the drawings) such as a cable interface to acquire video image data from the camera 15, and a feature extraction section 17a connected to the video image input section. The feature extraction section 17a extracts feature amounts (actual target action data) in the video data of an actual scene captured of a user etc. in the operation section space, as input from the camera 15. The feature extraction section 17a reshapes the video of the actual scene data that facilitates analysis, and extracts and accumulates feature amounts from the video image as detected data.

The anomaly detection section 17 includes a learning section 17b and a storage section 17d. The learning section 17b acquires plural feature amounts relating to plural normal activities of operation section users from the feature extraction section 17a, derives plural normal action models (reference scene data sets), and holds the normal action models in the storage section 17d as a normal behavior dictionary. Plural normal behavior dictionaries 17d may be prepared that include normal action models learnt while varying parameters (such as, for example, processing parameters for haze reduction (image sharpening)). For each of the plural normal action models, the normal action is divided in advance into specific analysis regions in the video of the normal action and into action items in the normal action, and learning is performed individually for each specific analysis region and each action item. When learning is being performed, plural analysis regions are predetermined within video images of action items following an operation sequence, learning is performed for each analysis region and for each action item to derive the normal action model for the normal action. In this manner, feature amounts are extracted and feature amounts that are common by their presence in a single normal action are saved in advance as the normal action model. Each normal action model is computed automatically using a statistical method by the feature extraction section 17a from multiple video images that have been collected.

The anomaly detection section 17 illustrated in FIG. 1 also includes a detection section 17c. The detection section 17c determines on an anomaly level based on target feature amounts extracted by the feature extraction section 17a from video images of an operation sequence performed by a target user 10 as acquired by the camera 15, and based on the normal action models held in the learning section 17b. The detection section 17c outputs an anomalous occurrence signal according to the anomaly level. For example, the detection section 17c computes an anomalous value by comparing feature amounts for detection against the held normal action model corresponding to each action item along the operation sequence. When the anomalous value is a specific threshold value or greater, processing is performed to weight the anomalous value according to an importance level of each action item to determine on the anomaly level, and an anomalous occurrence signal is output according to this anomaly level.

Feature amounts are extracted from the video images of the operation section space to be checked in order to recognize a pattern of anomalous actions by a user. Examples of feature amounts that may be employed include the shapes of objects and the movements of objects in the video, such as edge angles, curvatures, areas etc. of the card port 13b and the receipt port 13c in the video image. Feature amounts are usually expressed as feature vectors. Generally, a space defined by plural feature vectors is referred to as a feature space, and individual feature vectors are expressed as single points in the feature space. In single model using a pattern recognition method, the plural feature vectors (feature amounts) are similar to each other for the same class (action item, analysis region) of action in a sample, and differ from the feature vectors of another class of action. This results in clusters (groups of points) that form for each class in the feature space. A specific example of such a method is introduced in "ARGUS: Adaptive Recognition for General Use System: Its theoretical construction and applications" (Nobuyuki OTSU, published in Synthesiology Vol. 4(2), pp. 70-79, May 2011 (5.6: Anomaly Detection)).

Figure 6:
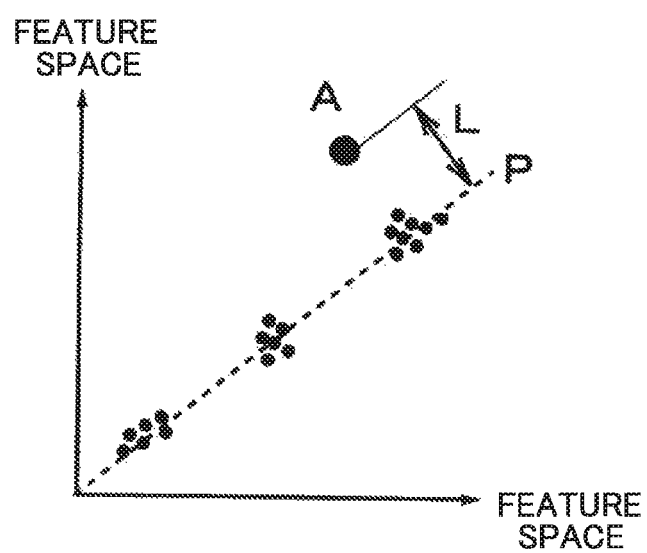
FIG. 6 is a graph illustrating a relationship between normal action models and detected data in feature space, as employed in action determination performed by a surveillance device of the first exemplary embodiment.

FIG. 6 is a schematic illustration of a normal action model and detected data in simplified feature space. In order to simplify explanation, the feature space in FIG. 6 is represented in two dimensions (in reality there are 251 dimensions), and a partial space P of a normal action is represented in one dimension, with feature amounts for the normal action forming groups for each action subject to monitoring. A derived normal action partial space S is present in the vicinity of a shape that encompasses the feature amounts of the normal action. A feature amount A of an anomalous action that deviates therefrom has a greater perpendicular distance L from the normal action partial space S, and the anomalous value is determined by the perpendicular distance L. The clusters of the plural finely scattered dots configure the normal action model (feature vector sets for a given normal action). The large circle A marked by a single dot is the position of detected data (a feature vector of an anomalous action that differs from the given normal action).

For example, the detection section 17c uses the normal behavior dictionaries 17d generated in advance by learning to find the distance between the normal action model and the position of the detected data (feature amount), and uses this as an anomalous value. The anomalous value will be larger the greater the distance (L in FIG. 6) between the normal action model and the position of the detected data.

Referring to FIG. 1, the surveillance device 11 may include an alarm section 18 to generate a warning announcement according to the anomalous occurrence signal from the detection section 17c, and a communication section 19 that externally outputs the anomalous occurrence signal.

In cases in which the anomalous value is greater than a predetermined threshold value, the detection section 17c notifies at least one out of the alarm section 18 or the communication section 19. The alarm section 18 is an anomaly response section that triggers an alarm using the sound of an alarm bell or the like. The communication section 19 is capable of functioning as part of the anomaly response section and includes, for example, configuration to transmit video image data from the camera to a surveillance center while retaining a log of video images, configuration to call a surveillance agent, a security agent, or a bank employee, configuration to communicate with the ATM 13 to interrupt processing and restart processing from the beginning, and configuration to communicate with the ATM 13 to issue a warning by voice that is either recorded or issued remotely. The log referred to here is video image data and text data for generated information etc. accumulated in a time series using a specific format.

The surveillance device 11 is a computer including a CPU and memory (ROM, RAM, a HDD, etc.) configured to control the elements of the anomaly detection section 17 by coordination between the CPU and the memory based on programs installed in the memory, so as to write, read, and process various data such as measurement data between these elements. Processing by the elements in the anomaly detection section 17 of the surveillance device 11 may be implemented using software, hardware, or a combination of software and hardware. Programs configuring software are, for example, pre-stored in memory of the device. These programs are then, for example, read into the RAM when they are to be executed by the computer, and executed by the CPU.

Operation Sequence, Action Items, and Importance Levels

A normal action flow of ATM operation by a user, which is somewhat pre-ordained, is employed in order to perform pattern recognition for an anomalous action by a user.

Various actions are (an operation sequence is) performed in a single transaction by the user 10 of the ATM 13. Explanation follows regarding an example in which the ATM 13 is an automated cash deposit machine only capable of accepting cash deposits.

FIG. 7 is a table illustrating a relationship between a normal action flow for a user performing a deposit operation sequence using the ATM 13, and the analysis regions and importance levels thereof. The information in this table is stored in the storage section 17d of the surveillance device 11.

The importance levels in FIG. 7 are set with ranks according to the content of the specific action at the operation section when criminal behavior etc. is being performed. An explanation regarding the importance level is that, when an anomaly is detected for a particular action item, there are some action items for which notification is desirable even in the case of a slight anomaly, and there are also some action items for which notification is not necessary for minor anomalies. For example, there is a possibility of criminal behavior when an anomaly is detected during the action of "card insertion", whereas the likelihood of criminal behavior is low when an anomaly is detected during the action of "receipt collection" since the card employed thus far in a transaction is still held inside the ATM.

The importance levels are preferably set in this manner, based on the content of a particular action at the operation section, and, for example, how easily criminal behavior could be performed, so as to spot criminal behavior as often as possible.

In the example of the importance levels for each action item in FIG. 7, the higher numerical values indicate higher importance levels.

An object of the first exemplary embodiment is to detect criminal behavior, however the values of the respective importance levels may be adjusted for an objective of detecting anomalous actions.

In cases in which anomalous actions are detected with the aim of issuing a warning to a user, when anomalous behavior has arisen during "receipt collection" or "card retrieval", the importance level should be raised since there is a possibility of forgetting to perform these actions. The importance levels may also be raised in cases in which a user is performing an action in which errors are likely to occur, an action in which confusion is likely to occur, or an action in which forgetting something is likely to occur.

Other cases in which the importance level is preferably set higher the more important the action is from a security perspective include the actions of "PIN input" and "card insertion" when the objective is to prevent fraud.

Recent criminal behavior also include criminal behavior such as bank transfer fraud in which the user is being lead. It is thus preferable to set higher importance levels for particular actions in which the characteristic actions of criminal behavior tend to appear when the user is being lead.

As illustrated in FIG. 7, the deposit operation sequence begins with action item 1, in which the user 10 inserts a card 25 into a card port. An instruction to input a PIN appears on the screen 13d of the ATM. The user inputs their PIN using the number keys 13e as action item 2. If the PIN is correct, the ATM 13 automatically opens the shutter 13a, as action item 3. The user 10 inserts cash in the form of banknotes through a shutter opening, as action item 4. The ATM 13 automatically closes the shutter 13a, as action item 5. The ATM 13 dispenses a receipt through the receipt port 13c and so the user 10 collects the receipt, as action item 6. The ATM 13 then dispenses the card 25 through the card port 13b (action item 7), and so the user 10 retrieves the card 25, as action item 8, and the transaction is ended.

Plural action items along a reference operation sequence are respectively associated with plural normal action videos capturing normal actions during a transaction by a standard user. The learning section 17b and the storage section 17d illustrated in FIG. 1 accordingly, do not learn all the actions in a sequence as a single normal action for constructing a normal action model; but instead divide the action into each of the individual action items, which are then learnt to construct plural normal action models.

Even within a single normal operation sequence, users move in completely different ways at every location of the ATM operation section (the card port, etc.). Accordingly, instead of analyzing the entire range of video images, a sequence of actions is divided into the individual action items, analysis regions are set for each action by dividing the range of the video images into small areas, and these analysis regions are then analyzed. The analysis regions are also referred to simply as "regions" hereafter.

In FIG. 7, the regions are associated with the respective actions performed. In this example, the different actions are performed in four analysis regions, namely the card port, the number keys, the shutter, and the receipt port.

Figure 8:
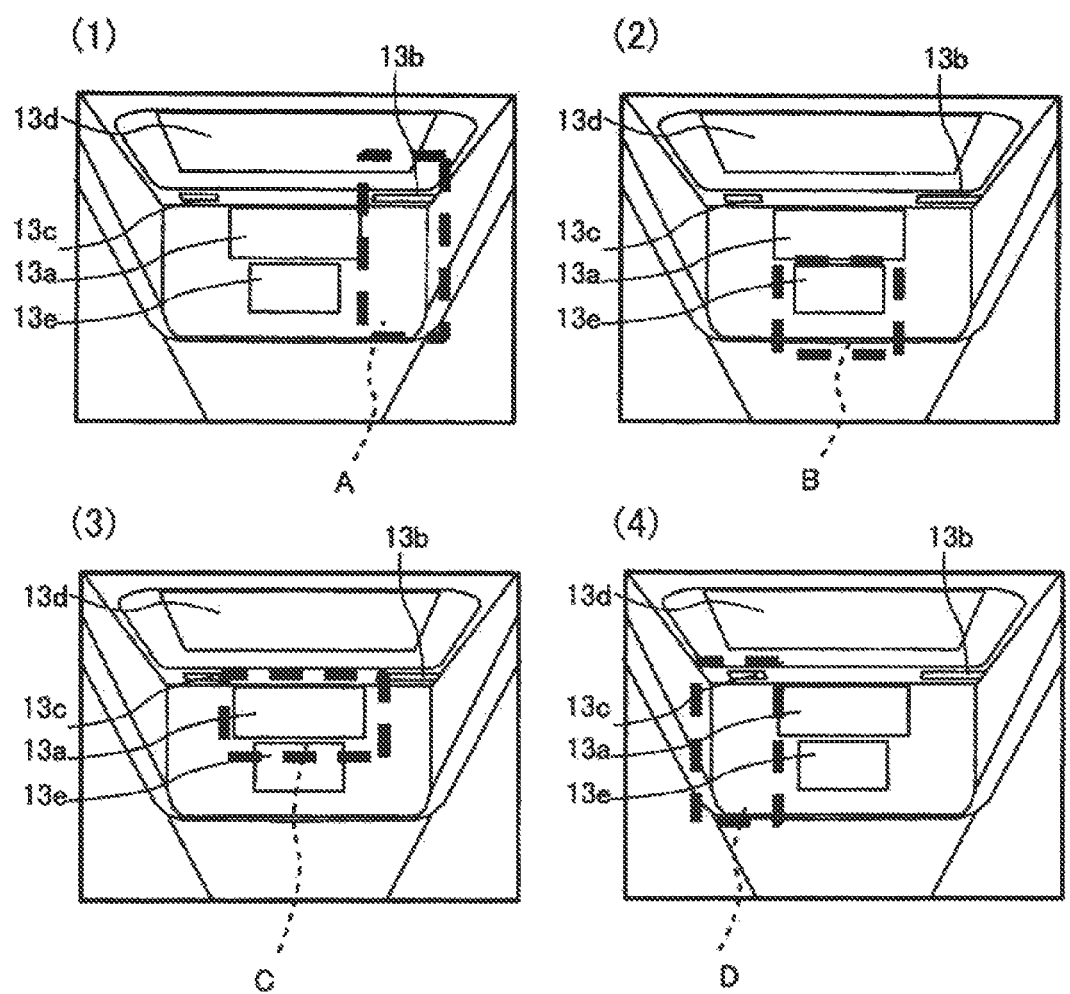
FIG. 8 is an overhead view to explain an example of a way to divide an action into analysis regions where it is performed in an automated transaction device according to the first exemplary embodiment.

FIG. 8 illustrates an image of the four analysis regions. Plural of the analysis regions are provided within a single video image. A "card port region" surrounded by the dashed line A in FIG. 8(1) is a region including the card port 13b. A "number key region" surrounded by the dashed line B in FIG. 8(2) is a region including the number keys 13e. A "shutter region" surrounded by the dashed line C in FIG. 8(3) is a region including the shutter 13a. A "receipt port region" surrounded by the dashed line D in FIG. 8(4) is a region including the receipt port 13c.

As a method of dividing regions, as well as a method of dividing into different locations where actions are performed, regions can also be provided at locations where actions are frequently performed. Namely, regions may be set according to a high frequency of action at the operation section. The analysis regions are preferably provided as regions at locations where the content of a particular action, for example criminal behavior, is likely to be performed at the operation section. Moreover, for example, since illegal devices are rarely attached to the receipt port, the provision of an analysis region at the receipt port may be considered unnecessary.

In cases in which one of the aims of the anomalous action detection of the present disclosure is to detect the contents of a particular action at the operation section, such as a user making an error or being confused in operation of the ATM, forgetting a card or receipt, or the like, analysis regions may be set at particular locations of the operation section where errors, confusion, or forgetting readily occurs.

In cases in which the aim is fraud prevention, then the analysis regions may be set at portions related to security of the PIN, the card port, and the like, and at particular locations important from a security perspective.

In cases in which plural regions are provided in each video image, the learning section 17b illustrated in FIG. 1 learns from video in the range of each region, and the detection section 17c performs a comparison against a normal action model learnt for the same regions during detection.

As a way of dividing into action items, a method may be employed to divide "by action content" such as the division of action items illustrated in FIG. 7, or a method may be employed to divide into action items "by location where the action is performed". However, although the action items 1 and 8 in FIG. 7 are different actions, namely "card insertion" and "card retrieval", the region is the same for both (i.e. the card port). Namely, sometimes, different actions are performed at the same location.

Figure 9:
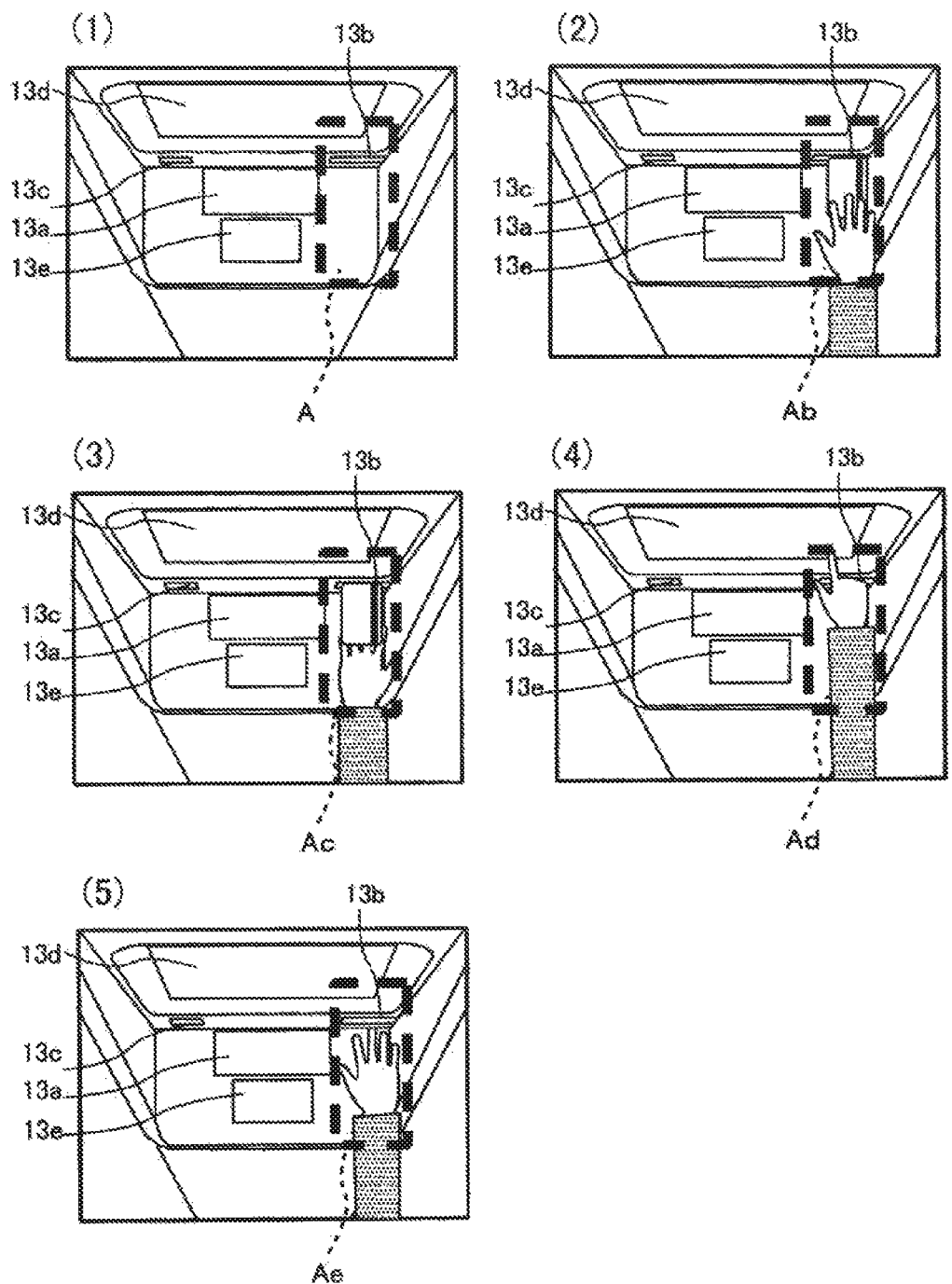
FIG. 9 is an overhead view to explain an example of an action that may occur in a "card port" analysis region in which actions are performed in an automated transaction device according to the first exemplary embodiment.

Moreover, various actions may occur within normal behavior. FIG. 9 illustrates examples of actions that may occur in the "card port" region. Actions that may occur during a normal action flow include a "no action" state such as that in FIG. 9(1), a "card insertion" state of a normal action flow such as that in FIG. 9(2), a "card retrieval" state such as that in FIG. 9(3), a "screen pointing (pressing)" state such as that in FIG. 9(4), and a "hand on ATM" state such as that in FIG. 9(5). Accordingly, in the learning section 17b and the storage section 17d illustrated in FIG. 1, the action illustrated FIG. 9(1) is learnt as "no action", and the actions illustrated in FIG. 9(1), FIG. 9(4), and FIG. 9(5) are learnt as "other normal behavior", and a normal action model constructed therefrom.

FIG. 10 is a table illustrating relationships between regions and actions learnt in the learning section 17b and storage section 17d illustrated in FIG. 1.

As illustrated in FIG. 10, two types of action, namely "card insertion" and "card retrieval", are learnt for the card port region. One type of action (respectively PIN input, banknote insertion, and receipt collection) is learnt at each of the remaining three regions (number keys, shutter, receipt port). Moreover, a "no action" state and "other normal behavior" are learnt for each region. A total of 13 individual actions are learnt across the four regions, and a normal action model is constructed for each of these actions in the storage section 17d. "No action" may also be used to identify whether or not any action is occurring. "Other normal behavior" may be employed to detect whether or not an anomaly is occurring in another region when an action is occurring in a given region.

The surveillance device 11 of the first exemplary embodiment illustrated in FIG. 1 may include various anomaly response sections. Explanation follows regarding the anomaly response sections.

The surveillance device 11 includes an alarm trigger section of the alarm section 18 described above that operates as an anomaly response section according to an anomalous occurrence signal from the detection section 17c. The surveillance device 11 also includes the communication section 19 described above. The communication section 19 functions as part of the anomaly response section. The surveillance device 11 may also include: a response section that operates according to an anomalous occurrence signal to issue a warning to a user by a voice that is either recorded or issued remotely; a response section that transmits video data captured by an imaging section to the surveillance center; a response section that retains a recording of video data captured by the imaging section; a response section that notifies a person such as a surveillance agent, a security agent, or a bank employee; and a response section that interrupts use of the automated transaction device and makes the user restart an operation from the beginning. These anomaly response sections are each provided with a communication section and an application for responding to anomalous occurrence signals.

Another configuration of an anomaly response section of the surveillance device 11 that operates according to an anomalous occurrence signal may be a configuration that uses light emission or display notation (for example on a second display separately arranged on the ATM) to visually notify an anomaly to the user or peripheral person according to an anomalous occurrence signal.

Another configuration of an anomaly response section of the surveillance device 11 that operates according to an anomalous occurrence signal may be a configuration that prompts attention to be drawn to a surveillance monitor either visually or by an audio section. For example, in cases in which video images are viewable in a surveillance center, an attention-catching sound or highlight may be used on the surveillance monitor to draw the attention of a surveillance agent.

Another configuration of an anomaly response section of the surveillance device 11 that operates according to an anomalous occurrence signal may be a configuration that makes the automated transaction device unusable. For example, the ATM 13 may be made to be unusable by the user 10.

Another configuration of an anomaly response section of the surveillance device 11 that operates according to an anomalous occurrence signal may be a configuration that records card number data and the like of the user 10, together with actual target action data, anomalous values, anomaly levels, and the like, namely a configuration that keeps a log.

Another configuration of an anomaly response section of the surveillance device 11 that operates according to an anomalous occurrence signal may be a configuration that images the faces of users and keeps this video data. For example, face information of the user 10 may be imaged from different angles and kept.

A system of the present exemplary embodiment identifies a response method automatically. However, a method may be employed in which the response method is selected and determined by a person, for example by a surveillance agent, after the surveillance agent etc. has checked a video image in which an anomaly has been detected.

Accordingly, another configuration of an anomaly response section of the surveillance device 11 that operates according to an anomalous occurrence signal may be a configuration that includes all of the anomaly response sections of the surveillance device described above, or at least two of the anomaly response sections of the surveillance device described above, and also includes a selection section to select at least one of the response sections of the surveillance device according to an anomalous occurrence signal. In such cases, the selection section of the surveillance device 11 includes an external section that prioritizes selection of at least one response section of the surveillance device 11 according to an external signal from a person, for example a surveillance agent.

Moreover, selection states may be set for whichever of the anomaly response sections to select from out of the plural anomaly response sections, and then determine the anomaly response section automatically according to the anomalous occurrence signal (anomaly level).

Accordingly, another configuration of an anomaly response section of the surveillance device 11 that operates according to an anomalous occurrence signal may be a configuration that includes all of the anomaly response sections of the surveillance device described above, or at least two of the anomaly response sections of the surveillance device described above, and also includes a selection section to select at least one response section of the surveillance device according to an anomalous occurrence signal.

Anomaly Detection Processing

Figure 11:
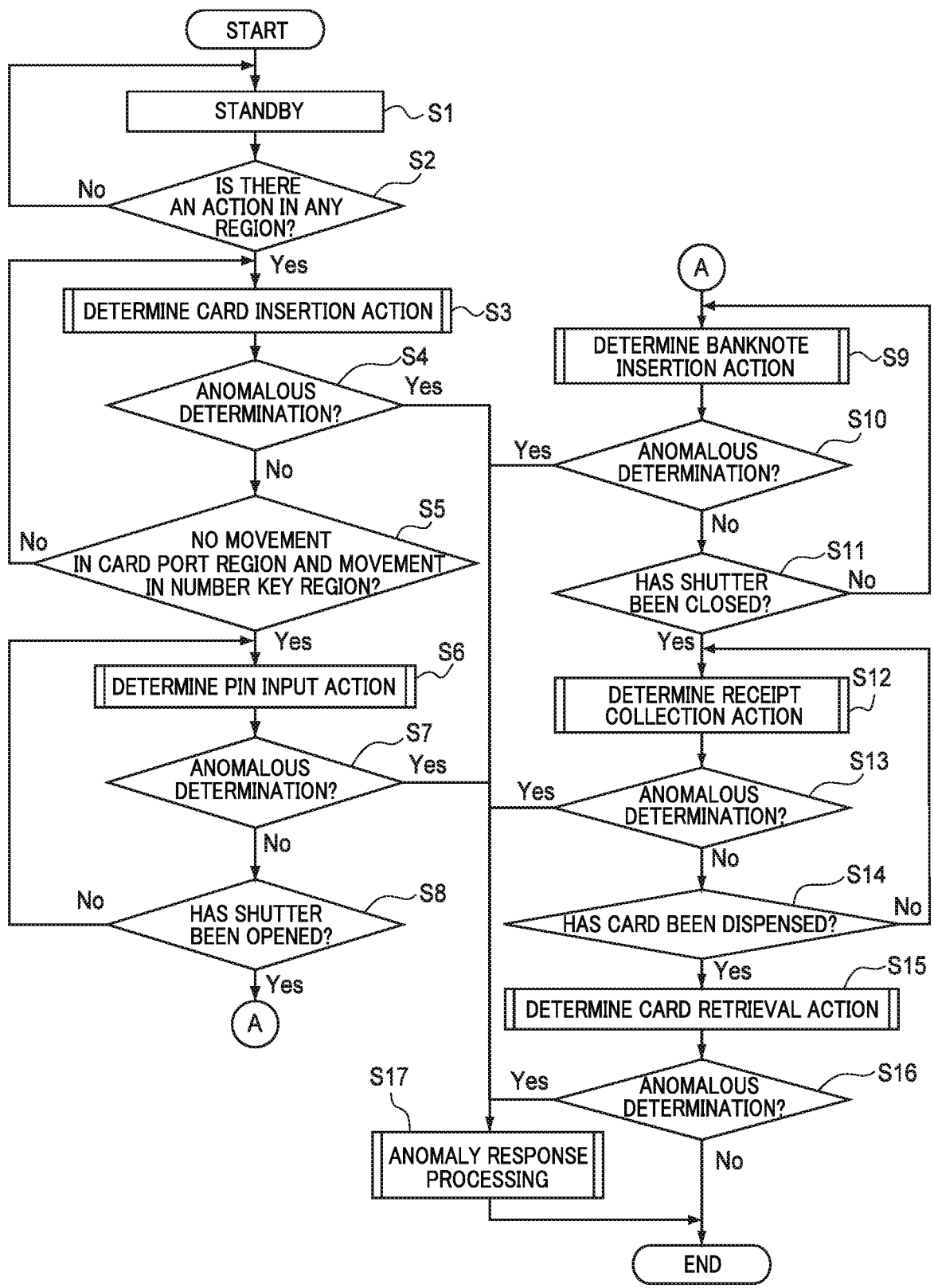
FIG. 11 is a flowchart illustrating an action flow performed by a surveillance device of the first exemplary embodiment.

Explanation follows regarding an action flow of the surveillance device 11 of the present exemplary embodiment, with reference to FIG. 11, FIG. 1, and FIG. 8. As background, this action flow is based on the flow of action items by a user 10 in an operation sequence such as that illustrated in FIG. 7 (operation of an automated cash deposit machine).

The anomaly detection section 17 of the surveillance device starts operation by placing the respective elements on standby in step S1.

A user 10 needs to insert the card 25 into the card port of the operation section in order to start a transaction at the ATM. The anomaly detection section 17 detects whether or not there is any movement in the four regions (FIG. 8) in the video data from the camera 15 (step S2). Anomalous action detection is started when movement has been detected. Otherwise, processing returns to step S1 and the surveillance device is again placed on standby until action is detected.

In cases in which movement has been detected and processing has proceeded to step S3, the anomaly detection section 17 performs card insertion action determination in step S3. The method of action determination is the same as that employed at the subsequent step S6, step S9, step S12, and step S15, and will therefore be explained later.

Next, determination is made as to whether or not the result in step S3 of the card insertion action determination (step S4) is anomalous.

In cases in which the anomaly detection section 17 has determined an anomaly, processing proceeds to step S17, and anomaly response processing is performed. In step S17 of the anomaly response processing, for example, the alarm section 18 executes the triggering of an alarm, calling out of a security agent, or the like. The anomaly response processing step S17 will be described in detail later. The processing flow is ended after the anomaly response processing.

In cases in which determination is no anomaly, the anomaly detection section 17 determines whether or not there is no longer movement in the card port region and there is movement in the number key region (step S5). Processing returns to the card insertion action determination (step S3) when negative determination is made.

In cases in which the anomaly detection section 17 has determined that there is no longer movement in the card port region and there is movement in the number key region, processing proceeds to step S6, and PIN input action determination is performed.

Next, determination is made as to whether or not the result in step S6 of the PIN input action determination (step S7) is anomalous.

In cases in which an anomaly has been determined, processing proceeds to step S17, and the anomaly detection section 17 performs anomaly response processing. The processing flow is ended after the anomaly response processing.

In cases in which determination is no anomaly, the anomaly detection section 17 determines whether or not the shutter has opened (step S8). For negative determination, processing returns to the PIN input action determination (step S6).

In cases in which the shutter has been determined to have opened, processing proceeds to step S9, and the anomaly detection section 17 performs banknote insertion action determination.

Next, determination is made as to whether or not the result in step S9 of the banknote insertion action determination (step S10) is anomalous.

In cases in which an anomaly has been determined, processing proceeds to step S17, and the anomaly detection section 17 performs the anomaly response processing. The processing flow is ended after the anomaly response processing.

In cases in which determination is no anomaly, the anomaly detection section 17 determines whether or not the shutter has closed (step S11). When negative determination is made, processing returns to the banknote insertion action determination (step S9).

In cases in which determination is that the shutter has closed, processing proceeds to step S12, and the anomaly detection section 17 performs receipt collection action determination.

Next, determination is made as to whether or not the result in step S12 of the receipt collection action determination (step S13) is anomalous.

In cases in which anomaly has been determined, processing proceeds to step S17, and the anomaly detection section 17 performs anomaly response processing. The processing flow is ended after the anomaly response processing.

In cases in which determination is no anomaly, the anomaly detection section 17 determines whether or not the card has been dispensed (step S14). If this determination is negative, processing returns to the receipt collection action determination (step S12).

In cases in which determination is that the card has been dispensed, processing proceeds to step S15, and the anomaly detection section 17 performs card retrieval action determination.

Next, determination is made as to whether or not the result in step S15 of the card retrieval action determination (step S16) is anomalous.

In cases in which determination is an anomaly, processing proceeds to step S17, and the anomaly detection section 17 performs anomaly response processing. The processing flow is ended after the anomaly response processing.

In cases in which no anomaly is the determination in step S16, the anomaly detection section 17 ends processing.

Action Determination Processing

Figure 12:
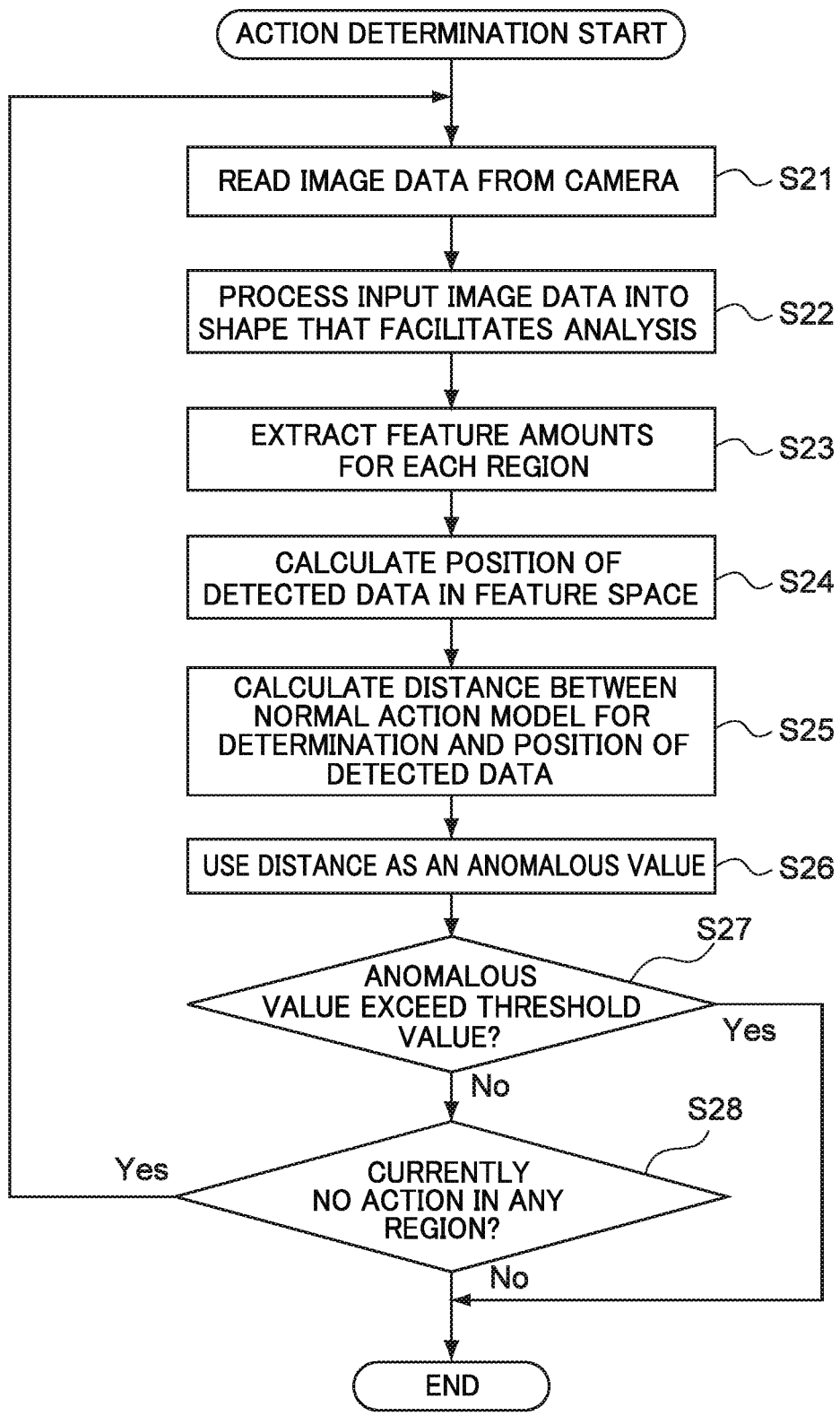
FIG. 12 is a flowchart illustrating an action flow of action determination performed by a surveillance device of the first exemplary embodiment.

Detailed explanation follows regarding steps for action determination (step S3, S6, S9, S12, S15). FIG. 12 is a flowchart illustrating an action flow of action determination performed by the automated transaction device of the first exemplary embodiment.

In step S21, video images from the camera 15 are read as actual scene data.

In step S22, processing is performed to reshape the input actual scene data that facilitates analysis. For example, the video images are resized and cropped, converted to grayscale, or the like in preparation for subsequent processing.

In step S23, feature amounts are extracted in the video images from the four regions of the actual scene data as detected data, and these feature amounts are accumulated.

In step S24, the positions of the detected data in the feature space are calculated individually for the feature amounts in each of the four regions.

In step S25, the distance is calculated between the normal action model being used in determination, and the position of the detected data (illustrated in FIG. 6).

In step S25, since determination for step S3 is determination of the card insertion action, feature amounts in the card port region are compared against a normal action model for "card insertion", and feature amounts for other regions are compared against normal action models for "other normal behavior".

In step S25, since determination for step S6 is determination of the PIN input action, the number key region is compared against a normal action model for "PIN input", and other regions are compared against normal action models for "other normal behavior". Note that step S25 is performed similarly to steps S9, S12, and S15.

Returning to FIG. 12, in a case in which the distance in step S26 is an anomalous value. The greater the distance away, the greater the likelihood that an action differs from the learnt normal action. The anomalous values are calculated individually for each region.

In step S27, whether or not the anomalous value exceeds a predetermined threshold value is checked for each region. In cases in which even one of the anomalous values has exceeded the predetermined threshold value, "anomalous determination" is made, and the processing is ended. Otherwise, processing proceeds to step S28. In cases in which it is determined that no action has occurred in any of the regions, processing is ended as-is. In cases in which an action is continuing, processing returns to step S21.

Anomaly Response Processing

Detailed explanation follows regarding the anomaly response processing of step S17.

Figure 13:
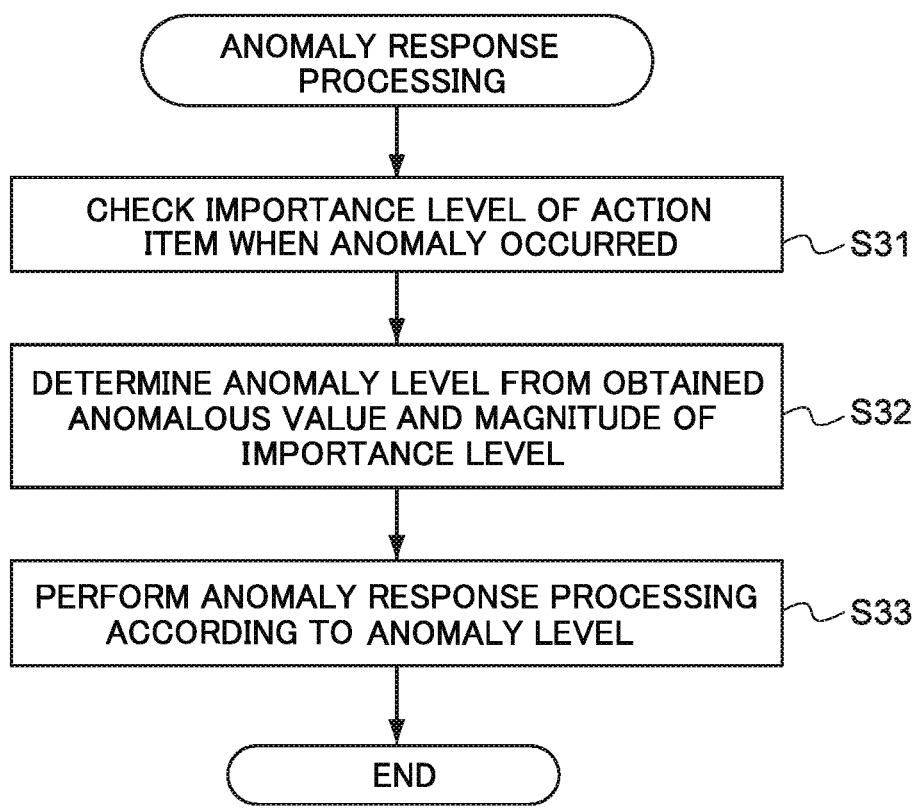
FIG. 13 is a flowchart illustrating an action flow of anomaly response processing performed by a surveillance device of the first exemplary embodiment.

FIG. 13 is a flowchart illustrating an action flow of anomaly response processing performed by the automated transaction device of the first exemplary embodiment. FIG. 14 is a table illustrating examples of anomaly levels and anomaly responses performed by the automated transaction device of the first exemplary embodiment. Anomaly level A is the highest anomaly level, and anomaly level E is the lowest anomaly level.

In step S31 of the anomaly response processing, the importance level (FIG. 7) of an action item for which an anomaly has occurred is checked.

In step S32, the "anomaly level" serving as an indication of the degree of anomaly is determined from the magnitudes of the anomalous value and the importance level obtained in step S32. The "anomaly level" may also be determined using the anomalous value alone.

In step S33, an anomaly response is performed according to the anomaly level, as illustrated in FIG. 14. For example, the anomalous action detection section 17 contacts a security agent via the communication section 19 in cases in which calling out a security agent is set for an anomaly level A.

When triggering an alarm is set for an anomaly level B, an alarm by the alarm section 18 is triggered in step S33.

When restarting ATM operation is set for an anomaly level C, a command to restart operation is sent to the ATM 13 via the communication section 19 in step S33.

When retaining a video image log is set for an anomaly level D, video image data is sent to the surveillance center via the communication section 19 in step S33. A video image log is retained.

When issuing a warning by voice is set for an anomaly level E, a command to issue a warning by voice is sent to the ATM 13 via the communication section 19 in step S33.

In the first exemplary embodiment, in step S5, step S8, step S11, and step S14 in FIG. 11, the times of transition between action items is determined by the presence or absence of movement within the video images. Methods to determining the times of transition between action items include a method that employs when movement was detected (when movement has ceased being detected) within the video image, and a method employing when movement was detected (when movement has ceased being detected) within the regions.

Methods for determining the start (end) of a sequence of actions of the ATM include a method in which a user is imaged using a separate camera to detect when the user enters (leaves) a position in front of the ATM, and a method employing face detection in which the face of the user is imaged using a separate camera.

In the first exemplary embodiment described above, the surveillance camera is attached to the automated transaction device, and feature amounts (actual target action data) are computed in the video images (actual scene data). Consistent anomaly determination that anomalous behavior is occurring is automatically made in cases in which, for example, the behavior of the user deviates from pre-ordained behavior and learnt normal behavior, or when the behavior of the user corresponds to learnt anomalous behavior (a reference scene data set). This enables the execution of various responses in response to the anomaly.

Second Exemplary Embodiment

In the first exemplary embodiment, the anomaly detection section 17 is independent of the ATM 13, and so it is accordingly necessary to detect the time of transitions between actions of the user 10 in the video image data. In a second exemplary embodiment, the anomalous action detection section 17 is electrically connected to the ATM 13, and the anomalous action detection section 17 is configured so as to be capable of acquiring status information of the ATM 13. Note that the status information of the ATM is information reflecting information of when the ATM 13 has recognized the card 25, and information reflecting information of when the PIN input has been completed. The second exemplary embodiment differs from the first exemplary embodiment in that this ATM status information is employed to identify action items of the user.

Figure 15:
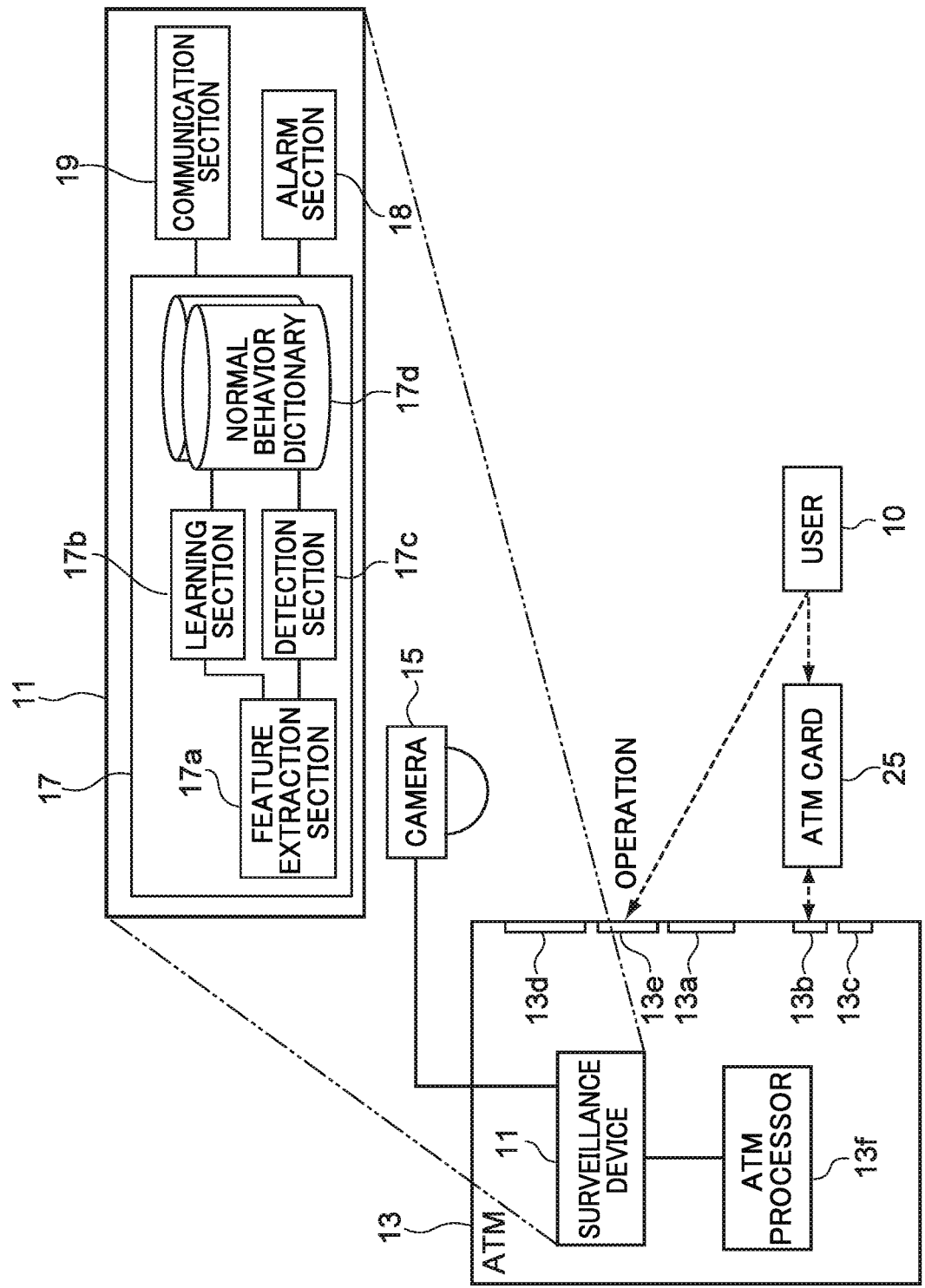
FIG. 15 is a block diagram illustrating configuration of an automated transaction device with an inbuilt surveillance device of a second exemplary embodiment of the present disclosure.

FIG. 15 is a block diagram illustrating configuration of an automated transaction device with an inbuilt surveillance device of the second exemplary embodiment according to the present disclosure. As illustrated in FIG. 15, configuration of the second exemplary embodiment is the same as configuration of the first exemplary embodiment, with the exception that the surveillance device 11 is built into the ATM 13, and is connected to an ATM processor 13f.

In the second exemplary embodiment, being linked to the ATM processor 13f that performs cash processing and the like of the ATM 13 enables the surveillance device 11 to receive ATM status information.

Figure 16:
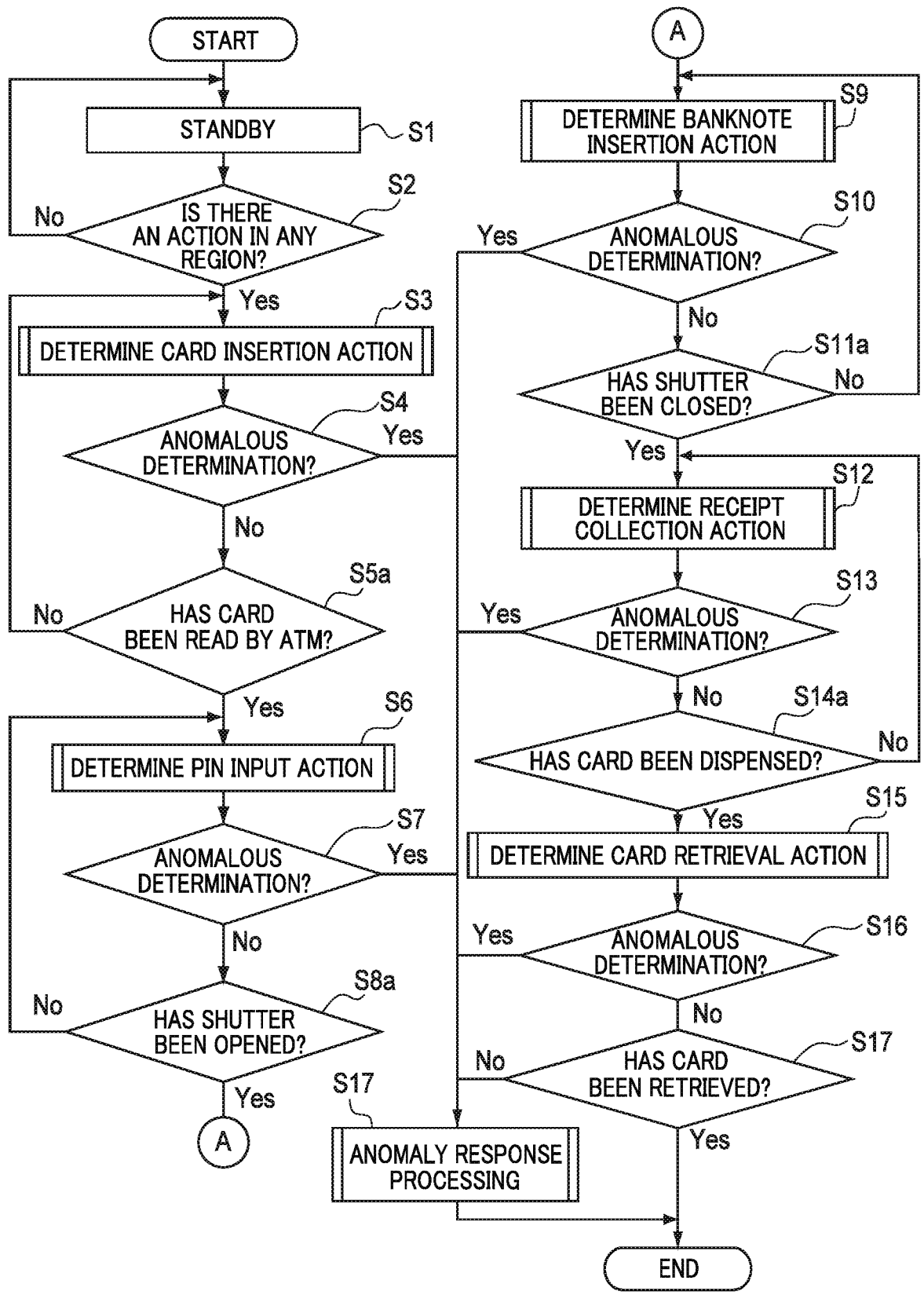
FIG. 16 is a flowchart illustrating an action flow performed by a surveillance device of the second exemplary embodiment.

FIG. 16 illustrates an action flow of the second exemplary embodiment. The action flow of the second exemplary embodiment is the same as the action flow configuration of the first exemplary embodiment, except that the steps S5, S8, S11, and S14 of the first exemplary embodiment have been respectively changed to steps S5a, S8a, and S11a, and step S17 (whether or not the card has been retrieved) has been added. Steps S5a, S8a, S11a, and S17 of the second exemplary embodiment are each steps to ascertain the status of the ATM by acquiring the ATM status information from the ATM processor 13f so as to enable identification. In the first exemplary embodiment, information regarding times of transition between action items is acquired in steps S5, S8, S11, and S14 from videos. However, in the second exemplary embodiment, the times of transition between action items can be identified by acquiring the status information from the ATM.

Modified Examples of the Second Exemplary Embodiment

In the first and second exemplary embodiments, the content of transactions the ATM is capable of performing is limited to "deposit" transactions. However, ATMs are generally capable of plural transactions, including "deposits", "abandon transaction", "withdrawals", and the like. In such cases, the operation sequence used for comparison in the ATM needs to be changed for each transaction performed by a user.

In the case of ATMs that perform plural transactions, a user generally selects which transaction to perform in partway through.

As an example, explanation follows regarding a case in which an action to select "deposit", "abandon transaction", or "withdrawal" from a touch panel of a screen is performed after action 2 (PIN input) during a flow of normal actions illustrated in FIG. 7.

When the user has selected "deposit", information regarding this selection is overwritten on the ATM status. Thus this system enables the status information to be acquired from the ATM, and the operation sequence to be changed so as to perform detection based on this status information.

Note that, to determine a transaction without employing the status information, the operation sequence may be changed according to an action detected at items that action is divided into.

Third Exemplary Embodiment

In a third exemplary embodiment, the face of a user is imaged by a separate camera, and identification is performed to identify character trait information and individuals using a face detection and matching method or the like. The results thereof are then used by a feature extraction section of the surveillance device to change or add parameters, such as parameters of models listing relationships between feature vectors and class, probability distribution parameters such as average vectors and covariance matrices (referred to simply as "parameters" hereafter), and to change or add normal behavior dictionaries.

Figure 17:
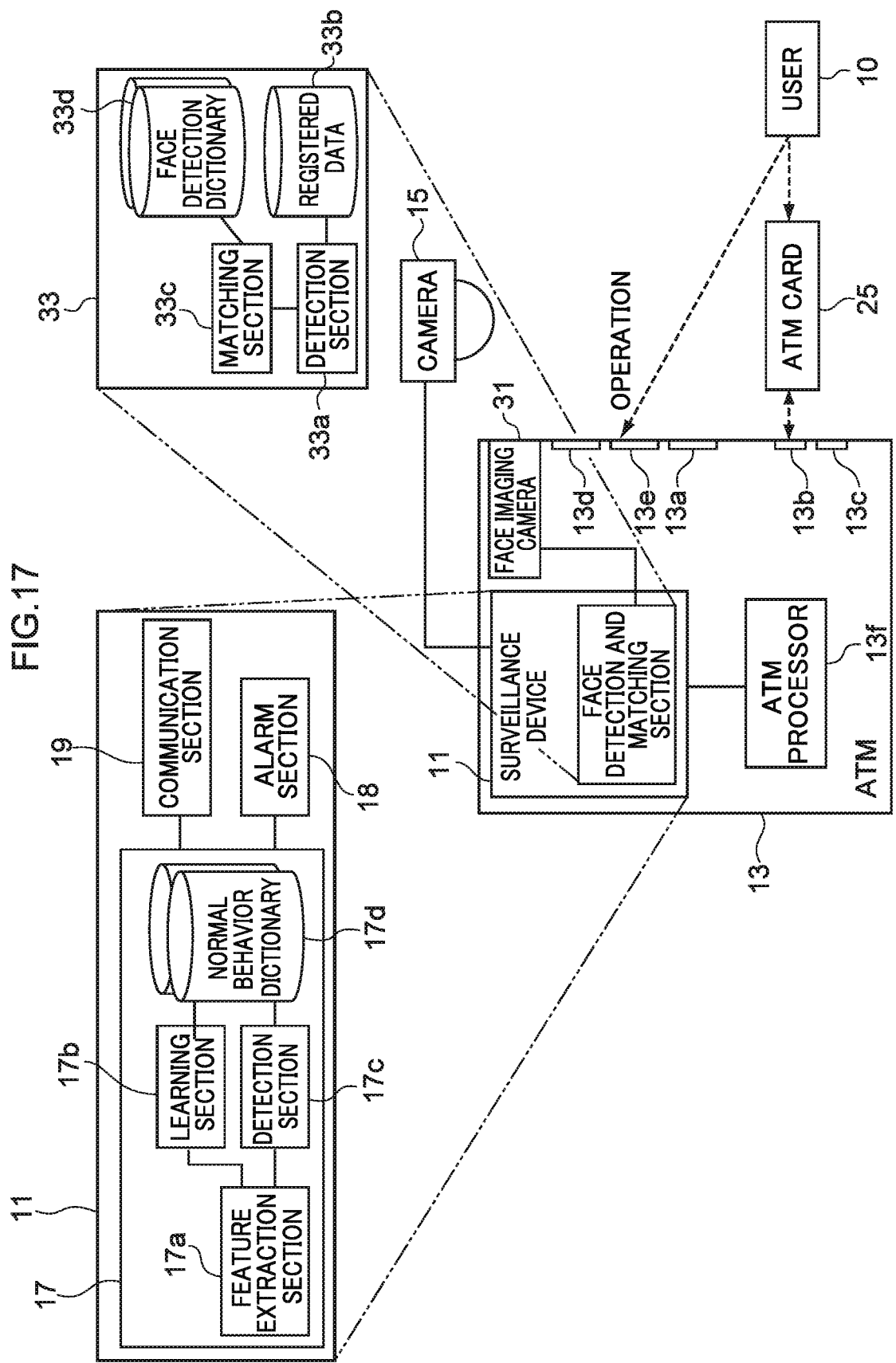
FIG. 17 is a block diagram illustrating configuration of an automated transaction device with an inbuilt surveillance device of a third exemplary embodiment.
Figure 18:
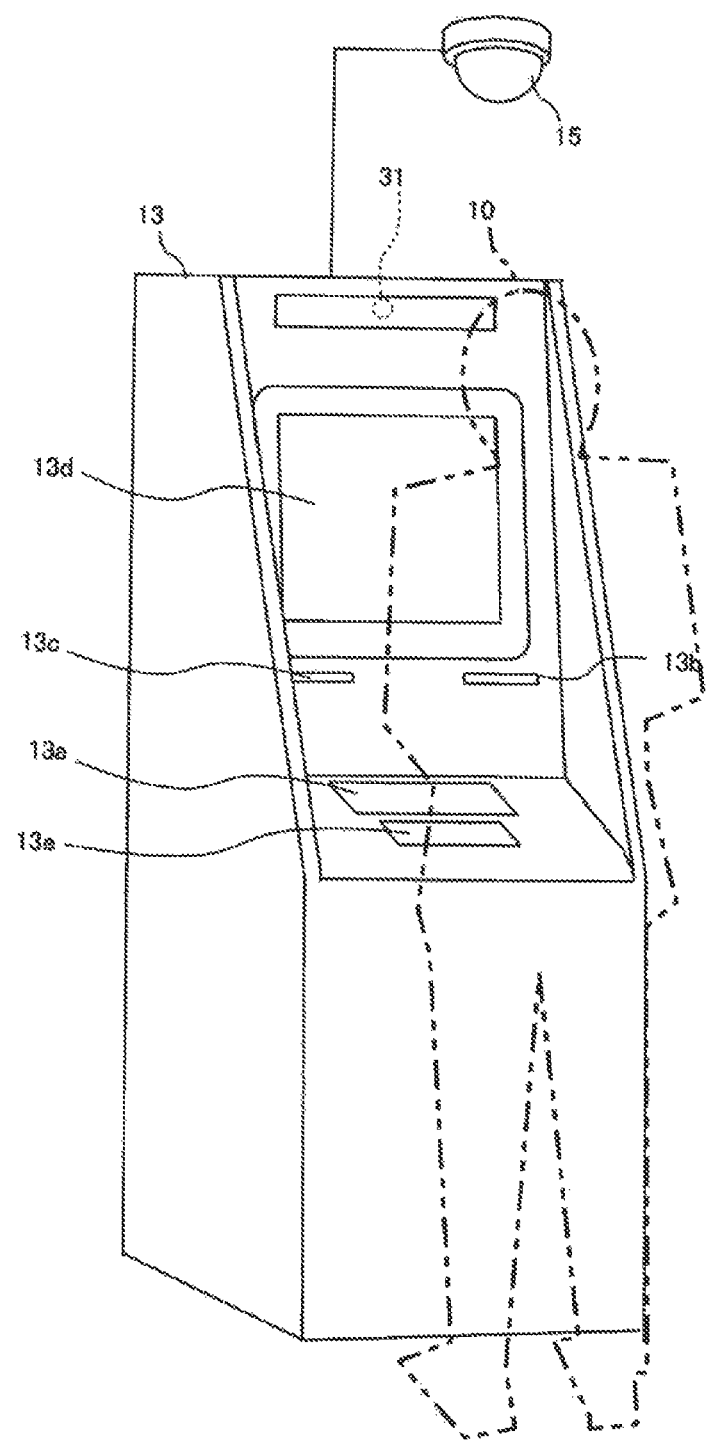
FIG. 18 is a schematic perspective view illustrating an automated transaction device according to the third exemplary embodiment.
Figure 19:
FIG. 19 is a line drawing illustrating a schematic image of a user acquired by a face imaging camera in the third exemplary embodiment.

FIG. 17 is a block diagram illustrating configuration of the third exemplary embodiment. FIG. 18 is a schematic perspective view illustrating an external configuration of an ATM 13 of the third exemplary embodiment. FIG. 19 is a line drawing illustrating a schematic image of a user acquired by a face imaging camera of the third exemplary embodiment.

In the third exemplary embodiment, a face imaging camera 31 to image the face of a user is provided in addition to the camera employed in the second exemplary embodiment. As illustrated in FIG. 18, the face imaging camera 31 above the screen 13d of the ATM 13 is, for example, mounted inside a casing and behind a one-way mirror for checking behind so as not to be visible from the exterior. As illustrated in FIG. 19, the camera 31 is disposed so as to be able to adequately image the face of the user.

As illustrated in FIG. 17, the third exemplary embodiment is configured by adding the face imaging camera 31 and a face detection and matching section 33 to the second exemplary embodiment. The third exemplary embodiment is otherwise configured similarly to the second exemplary embodiment. The face detection and matching section 33 includes a detection section 33a that detects human faces, a storage section for registered data 33b containing registered face data, and a matching section 33c that compares the registered data 33b against detected face image data to see if there is a match to the same person. The face detection and matching section 33 also includes a storage section for a face detection dictionary 33d. The face detection dictionary 33d contains information about a face model constructed when faces were learnt in advance, and is employed by the detection section 33a in face detection.

The face detection dictionary 33d may, for example, be stored with images organized into plural categories such as, for example, images of the faces of people wearing masks and people wearing sunglasses, images of the faces of people not wearing any such accessories, images of the faces of particular individuals, such as foreigners.

The face detection and matching section 33 changes a threshold value for a parameter of the detection section 17c of the anomalous action detection section 17 such as, for example, an anomalous value, so that the threshold value is higher when some or most of the face of the user 10 is concealed by a mask, sunglasses, hat, or the like, and such a face state has been detected.

Instead of raising the threshold value for the anomalous value, the face detection and matching section 33 may change parameters of the feature extraction section 17a, or add a normal behavior dictionary 17d (reference scene data set) for the anomalous action detection section 17 and change to using this from the behavior dictionary 17d usually employed.

Instead of detecting concealment of the face, the face detection and matching section 33 may change parameters or the like of the anomalous action detection section 17 according to the age and gender of the user as identified by detecting the face of the user 10. The face detection and matching section 33 may also use a method in which the gender of the user is identified, and detection is performed using the normal behavior dictionary 17d corresponding to that gender.

In the face detection and matching section 33, in cases in which the matching section 33c is, for example, used for crime detection, the faces of repeat offenders are pre-registered in the registered data 33b. When the matching section 33c has detected the face of a user 10 matching or bearing a strong degree of resemblance to the face of a repeat offender, the threshold value in the detection section 17c for an anomalous value may be raised, or another parameter may be raised.

When an anomaly has been detected by the anomalous action detection section 17, in cases in which the face of the user 10 is detected and matched against the registered data 33b but there is no one with a resembling face in the registered data 33b, the face of this user may be registered in the registered data 33b. The response method may be changed in cases in which the detection section 33a has determined the face have already been registered.

In the third exemplary embodiment, a combination is employed of detecting the face of a user by a separate camera and using matching information. This enables repeat offenders to be prevented from carrying out another crime, facilitates detection of suspicious persons, and enables detection using a normal behavior dictionary that matches the traits of a user, such as age and gender.

Action Flow of Another Exemplary Embodiment

Figure 20:
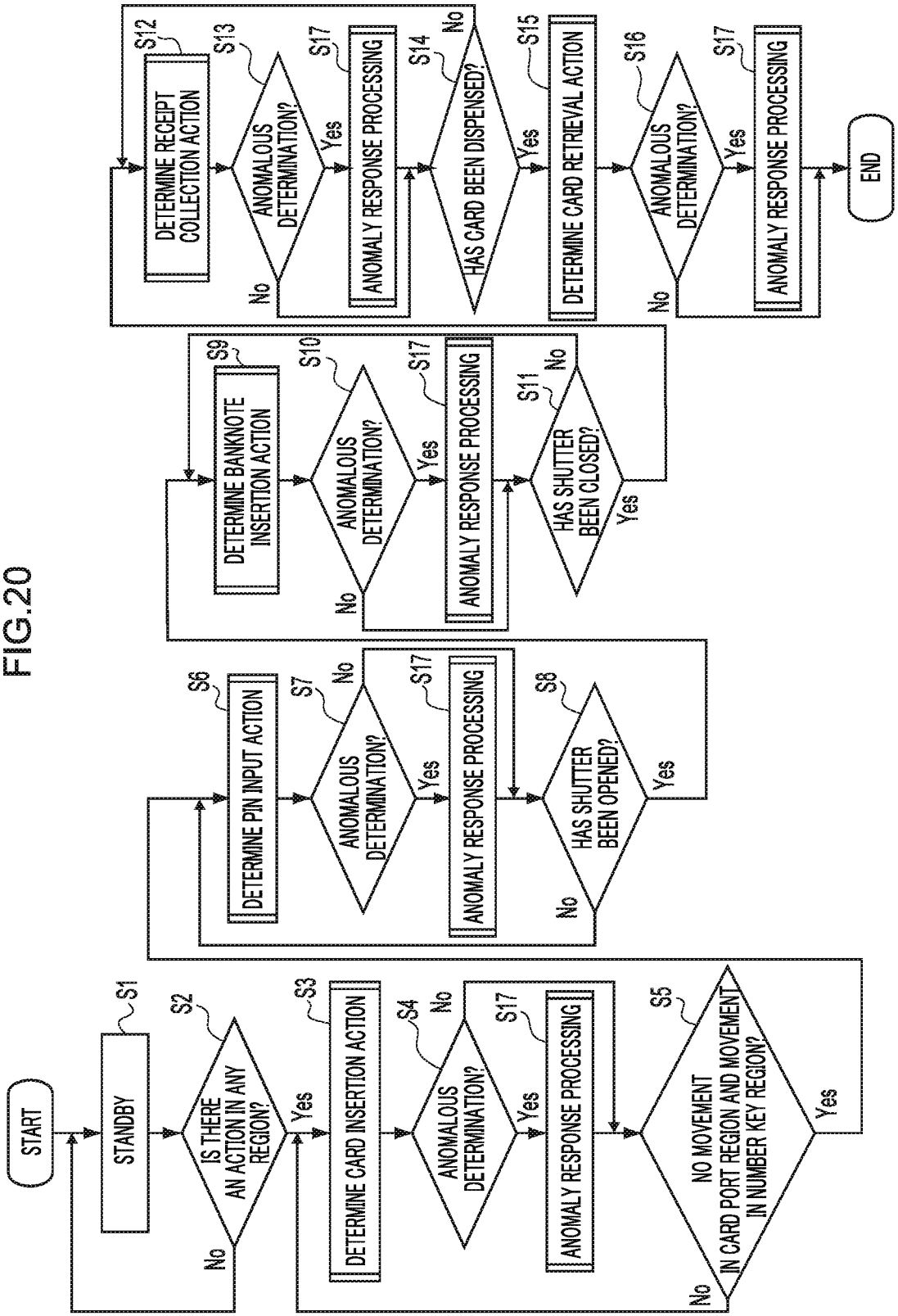
FIG. 20 is a flowchart illustrating an action flow of action determination performed by a surveillance device of another exemplary embodiment.

Explanation follows regarding an action flow of a surveillance device 11 of another exemplary embodiment, with reference to FIG. 20. In the first to the third exemplary embodiments described above, the processing flow is ended (FIG. 11) after the anomaly response processing in anomaly detection. However, in this other exemplary embodiment, as illustrated in FIG. 19, a step S17 for anomaly response processing is introduced between steps S4 and S5, between steps S7 and S8, between steps S10 and S11, and between steps S13 and S14 and this step is made skippable. This enables operation to continue without being ended, even in a configuration in which anomalies are detected and processing proceeds to step S17 for anomaly response processing.

The entire disclosure of Japanese Patent Application No. 2016-136498 is incorporated by reference in this specification.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A surveillance device that monitors an operation section of an automated transaction device, the surveillance device comprising:
   a learning holding section that learns and holds a reference scene data set in which a reference operation is divided into a sequence of action items;
   a feature extraction section that extracts actual target action data from actual scene data of the sequence of action items in an operation of a user, the actual scene data obtained from an imaging section that faces and images the operation section; and
   a detection section that associates actual target action data with the reference scene data set along the sequence of action items, compares the associated actual target action data with the reference scene data set for each of the action items, determines an anomaly level of the operation of the user, and outputs an anomalous occurrence signal according to the anomaly level,
   wherein the action items are classified by images of partial regions within a single scene in the reference scene data.

2. The surveillance device of claim 1, wherein the learning holding section holds at least one analysis region in correspondence with the action item and in an association to the reference scene data, the analysis region encompassing an image of part of the operation section in the reference scene data.

3. The surveillance device of claim 2, wherein the analysis region is set for each different location corresponding to different actions at the operation section.

4. The surveillance device of claim 3, wherein the analysis region is set in accordance with content of a particular action at the operation section, or in accordance with a frequency level of an action at the operation section.

5. The surveillance device of claim 1, wherein:
   the feature extraction section extracts a feature amount from the actual scene data as the actual target action data; and
   the detection section compares the feature amount against the reference scene data to calculate an anomalous value of the feature amount, and determines the anomaly level from the anomalous value and an importance level for each of the action items.

6. The surveillance device of claim 5, wherein the importance level is set as a ranking according to content of a particular action at the operation section.

7. The surveillance device of claim 1, wherein the detection section identifies times of transition of the action items based on content of the actual scene data, or based on status information acquired from the automated transaction device.

8. The surveillance device of claim 1, wherein the detection section determines a start timing of an action when there is movement of a user in a video image from the actual scene data.

9. The surveillance device of claim 1, further comprising a response section that, according to the anomalous occurrence signal, issues a warning to a user with a recorded or remote voice.

10. The surveillance device of claim 1, further comprising a response section that, according to the anomalous occurrence signal, uses light emission or display notation to visually notify an anomaly to a user or a peripheral person.

11. The surveillance device of claim 1, further comprising a response section that, according to the anomalous occurrence signal, retains a record of video data imaged by the imaging section.

12. The surveillance device of claim 1, further comprising a response section that, according to the anomalous occurrence signal, makes the automated transaction device unusable.

13. The surveillance device of claim 1, further comprising a response section that, according to the anomalous occurrence signal, images the face of a user and keep this data.

14. A surveillance device that monitors an operation section of an automated transaction device, the surveillance device comprising:
- a learning holding section that learns and holds a reference scene data set in which a reference operation is divided into a sequence of action items;
- a feature extraction section that extracts actual target action data from actual scene data of the sequence of action items in an operation of a user, the actual scene data obtained from an imaging section that faces and images the operation section; and
- a detection section that associates actual target action data with the reference scene data set along the sequence of action items, compares the associated actual target action data with the reference scene data set for each of the action items, determines an anomaly level of the operation of the user, and outputs an anomalous occurrence signal according to the anomaly level,
- wherein the detection section identifies types of operation for a plurality of processes capable of being performed on the automated transaction device according to content of the actual scene data or based on status information acquired from the automated transaction device.

15. A surveillance device that monitors an operation section of an automated transaction device, the surveillance device comprising:
- a learning holding section that learns and holds a reference scene data set in which a reference operation is divided into a sequence of action items;
- a feature extraction section that extracts actual target action data from actual scene data of the sequence of action items in an operation of a user, the actual scene data obtained from a first imaging section that faces and images the operation section;
- a detection section that associates actual target action data with the reference scene data set along the sequence of action items, compares the associated actual target action data with the reference scene data set for each of the action items, determines an anomaly level of the operation of the user, and outputs an anomalous occurrence signal according to the anomaly level;
- a second imaging section that images the vicinity of a front face of the operation section; and
- a face detection and matching section including registered data of human faces for matching with the face of a user,
- wherein the face detection and matching section detects, by performing face detection by the second imaging section, when a person enters or when a person leaves a position in front of the automated transaction device, and to notify the detection section of a timing of a start or an end of an action.

16. The surveillance device of claim 15, wherein the face detection and matching section changes a parameter of the feature extraction section or the detection section, in a case in which the face detection and matching section has detected that the face of a user bears a strong resemblance to a person registered in the registered data.

17. The surveillance device of claim 15, wherein the face detection and matching section changes a parameter of the feature extraction section or the detection section, in a case in which the face detection and matching section has detected that some or most of the face of a user is concealed.

18. The surveillance device of claim 15, wherein the face detection and matching section changes a parameter of the feature extraction section or the detection section according to an age or gender identified for the user by detecting the face of the user.

19. The surveillance device of claim 15, wherein the face detection and matching section changes a parameter of the feature extraction section or the detection section, in a case in which the face of a user is determined as the face of a particular individual who is registered.

20. The surveillance device of claim 15, wherein the face detection and matching section matches the face of a user detected when an anomalous occurrence signal was acquired from the detection section with the registered data, and registers the face of the user in the registered data in cases in which there is no one with a resemblance to the user in the registered data.

* * * * *